US010374897B2

(12) United States Patent
Lusted et al.

(10) Patent No.: US 10,374,897 B2
(45) Date of Patent: *Aug. 6, 2019

(54) TECHNOLOGIES FOR AUTONEGOTIATING 10G AND 1G SERIAL COMMUNICATIONS OVER COPPER CABLE

(71) Applicant: Intel Corporation, Santa Clara, CA (US)

(72) Inventors: Kent C. Lusted, Aloha, OR (US); Adee O. Ran, Ma'ayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,122

(22) Filed: Jul. 24, 2018

(65) Prior Publication Data

US 2018/0331907 A1    Nov. 15, 2018

Related U.S. Application Data (63) Continuation of application No. 14/559,627, filed on Dec. 3, 2014, now Pat. No. 10,033,586.

(51) Int. Cl.
| | | |
|---|---|---|
| *H04L 12/28* | (2006.01) | |
| *H04L 12/24* | (2006.01) | |
| *H04L 29/06* | (2006.01) | |
| *H04L 12/935* | (2013.01) | |

(52) U.S. Cl.
CPC ...... *H04L 41/0886* (2013.01); *H04L 49/3054* (2013.01); *H04L 69/24* (2013.01)

(58) Field of Classification Search
None
See application file for complete search history.

(56) References Cited

U.S. PATENT DOCUMENTS

| | | | | |
|---|---|---|---|---|
| 6,148,002 A | * | 11/2000 | Patel | H04L 29/06 370/438 |
| 2002/0118412 A1 | * | 8/2002 | Gibson | H04B 10/0799 398/58 |
| 2004/0091027 A1 | * | 5/2004 | Booth | H04L 12/40136 375/219 |

(Continued)

*Primary Examiner* — Bob A Phunkulh
(74) *Attorney, Agent, or Firm* — Alliance IP, LLC (57) ABSTRACT

Technologies for autonegotiation of communications operational modes over copper cable include a network port logic having a communication link coupled to a remote link partner. The network port logic may start an autonegotiation protocol upon reset, when the link is broken, or upon manual renegotiation. The network port logic transmits an autonegotiation page to the remote link partner that indicates single-lane communications ability over copper cable. The network port logic receives an autonegotiation page from the link partner indicating single-lane communications ability over copper cable. If the network port logic and link partner have a common single-lane communication ability, the link may be activated. The autonegotiation pages may be base pages or next pages. The single-lane communication ability may be indicated by one or more bits of the autonegotation pages. The link may be established at 1 gigabit or 10 gigabits per second. Other embodiments are described and claimed.

20 Claims, 3 Drawing Sheets

(56) References Cited

U.S. PATENT DOCUMENTS

| | | | |
|---|---|---|---|
| 2004/0208180 A1* | 10/2004 | Light | H04L 1/0009 370/395.2 |
| 2005/0111531 A1* | 5/2005 | Booth | H04L 12/40136 375/219 |
| 2006/0098683 A1* | 5/2006 | Thaler | H04L 5/1438 370/462 |
| 2007/0121518 A1* | 5/2007 | Arunachalam | H04L 43/0811 370/249 |
| 2008/0069014 A1* | 3/2008 | Powell | H04L 12/413 370/278 |
| 2010/0075613 A1* | 3/2010 | Brown | H04W 28/22 455/69 |
| 2010/0077097 A1* | 3/2010 | Brown | H04L 29/04 709/233 |
| 2010/0229067 A1* | 9/2010 | Ganga | H03M 5/145 714/752 |
| 2010/0241880 A1* | 9/2010 | Wertheimer | G06F 1/3203 713/310 |
| 2011/0231527 A1* | 9/2011 | Herlein | G06F 8/61 709/220 |
| 2011/0255419 A1* | 10/2011 | Lee | H04L 12/413 370/242 |
| 2011/0261720 A1* | 10/2011 | Diab | H04L 41/0873 370/254 |
| 2013/0308941 A1* | 11/2013 | Diab | H04Q 11/0067 398/45 |
| 2014/0016637 A1* | 1/2014 | Masood | H04L 12/4013 370/390 |
| 2014/0086264 A1* | 3/2014 | Lusted | H04L 12/407 370/470 |
| 2014/0223265 A1* | 8/2014 | Lusted | H04L 1/004 714/776 |
| 2014/0258813 A1* | 9/2014 | Lusted | H04L 1/004 714/776 |
| 2014/0380132 A1* | 12/2014 | Ran | H04L 1/0057 714/776 |
| 2015/0003505 A1* | 1/2015 | Lusted | H04L 25/4917 375/224 |
| 2015/0146744 A1* | 5/2015 | Valliappan | H04L 41/0809 370/465 |
| 2015/0229588 A1* | 8/2015 | Pillai | H04L 49/3054 370/437 |
| 2015/0341277 A1* | 11/2015 | Gravel | H04L 47/25 370/468 |

\* cited by examiner

TECHNOLOGIES FOR AUTONEGOTIATING 10G AND 1G SERIAL COMMUNICATIONS OVER COPPER CABLE

CROSS-REFERENCE TO RELATED U.S. PATENT APPLICATION

This application is a continuation application of U.S. application Ser. No. 14/559,627, entitled "TECHNOLOGIES FOR AUTONEGOTIATING 10 G AND 1 G SERIAL COMMUNICATIONS OVER COPPER CABLE," which was filed on Dec. 3, 2014.

BACKGROUND

Ethernet using copper cabling and backplane may use several different operational modes for communication links. The various operational modes may have different link speed, line encoding, and other characteristics. Certain Ethernet standards define methods to autonegotiate one of several specifically enumerated physical layer technologies and operational modes to be used for a particular communication link. One such autonegotiation protocol is defined in Clause 73 of the IEEE standard 802.3 (2012). For copper cable applications, the lowest-speed operational mode available for clause 73 autonegotiation is 40-gigabit communication over four physical lanes (40GBASE-CR4). Additionally, clause 73 always attempts to activate the fastest common communication technology between the link partners.

Lower link speeds may be desirable for certain applications, such as for low-power applications including wake-on-LAN (WOL) applications, or for use with broken or lower-quality media (i.e., cable). For example, lower communication speed may be desirable when one of several physical lanes typically used is broken or otherwise not operable. Lower link speeds may be manually reconfigured using firmware or software solutions executed by both of the link partners. Successful manual reconfiguration of link technology may require close synchronization of changes made to both link partners.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
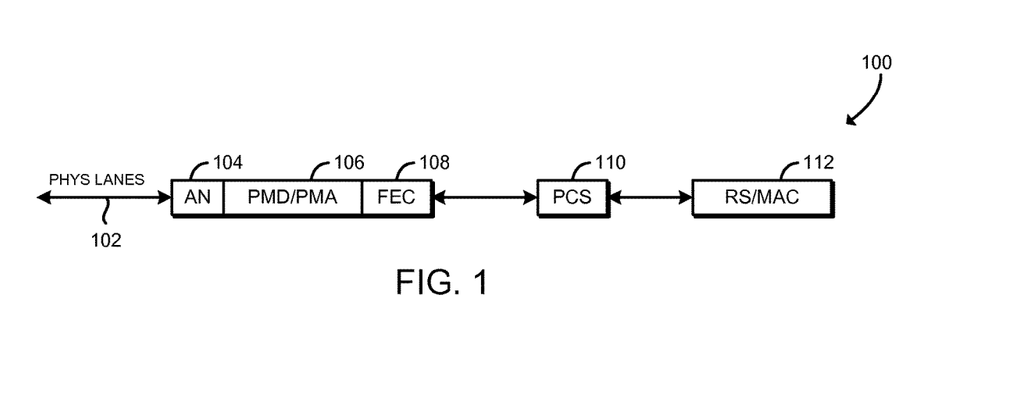
FIG. 1 is a simplified block diagram of at least one embodiment of Ethernet port logic for link technology autonegotiation.

Referring now to FIG. 1, an Ethernet port logic 100 is configured as a network controller or other network port logic to communicate over one or more physical communication lanes 102, which may be embodied as twinaxial copper cabling. In the illustrative embodiment, the Ethernet port logic 100 is configured to perform an autonegotiation process with a remote link partner. During autonegotiation, the Ethernet port logic 100 informs the link partner about the various technologies for communication over copper cabling that are supported (e.g., 1-gigabit or 10-gigabit single-lane communication). If at least one supported communications technology is also supported by the remote link partner, the Ethernet port logic 100 may bring up the communication link using the fastest common single-lane communication technology. Additionally, the Ethernet port logic 100 may provide re-negotiation and activation of slower communications technologies that are supported by both partners when desirable, e.g., during low-power operation or when communicating over a lower-quality physical medium. Thus, the autonegotiation process performed by the Ethernet port logic 100 may allow configuration of the communication link without requiring synchronized manual configuration or out-of-band communication and synchronization. Also, the Ethernet port logic 100 may perform autonegotiation without external configuration or other intervention by external firmware or software, which may allow link configuration when a computing device's main processor is powered down, such as in a connected standby power management state. The Ethernet port logic 100 may also allow autonegotiation of slower single-lane link speeds when one of the link partners also supports a future, higher-speed single-lane communication technology (e.g., 25-gigabit single-lane communications over copper cabling).

The illustrative Ethernet port logic 100 includes an autonegotiation module 104, a physical medium dependent (PMD) sublayer/physical medium attachment (PMA) sublayer 106, a forward error correction (FEC) sublayer 108, a physical coding sublayer (PCS) module 110, and a reconciliation sublayer/media access control sublayer (MAC) module 112. Additionally, in some embodiments, one or more of the illustrative components may be incorporated in, or otherwise form a portion of, another component. For example, part or all of the autonegotiation module 104, the PMD/PMA 106, and/or the FEC 108 may be incorporated in the PCS 110.

The communication lanes 102 may be embodied as any one or more computer communication links. For example, each communication lane 102 may be embodied as a twinaxial copper cable or as an electrical backplane connection. In some embodiments, each communication lane 102 may be capable of full-duplex operation. For example, each communication lane 102 may include two twinaxial pairs of electrical conductors, one pair for transmitting data and the other pair for receiving data. Illustratively, the communication lanes 102 may include a single communication lane 102 capable of operating at 10 Gb/s or 1 Gb/s. Although described as operating at a data rate such as 10 Gb/s, it should be understood that in some embodiments each of the communications lanes 102 may operate at a slightly higher signaling rate such as 12.5 Gb/s or 10.3125 Gb/s, to allow for additional data for line encoding, error correction, and other additional data.

The autonegotiation module 104 is configured to autonegotiate line transmission speed, mode of operation, and other communication parameters with a link partner when the communication lane 102 is brought up. Additionally, the autonegotiation module 104 is configured to exchange technology abilities information with the link partner. The technology abilities information may identify one or more relatively slower communications over copper cable operational modes (also known as physical layer technologies or technology abilities). For example, the technology abilities information may identify 10-gigabit single-lane communication over copper cabling and/or 1-gigabit single-lane communication over copper cabling. The autonegotiation module 104 may encode the technology abilities information in an autonegotiation page such as a base page (also called a base link codeword) or in a next page. The autonegotiation module 104 is further configured to bring up the communication lane 102 with the remote link partner using a common operational mode determined from the exchanged autonegotiation pages. Although illustrated in FIG. 1 as coupled between the PMD/PMA 106 and the communication lanes 102, in other embodiments the autonegotiation module 104 may be included at different positions in the Ethernet port logic 100. For example, in some embodiments the autonegotiation module 104 may be coupled between the PMD/PMA 106 and the FEC 108.

The PMD/PMA 106 is configured to transmit and receive serial binary data over the communication lanes 102. The PMD/PMA 106 may be embodied as, for example, a serializer/deserializer (SERDES) that converts serial data to parallel data. The SERDES may convert the serial data using, for example, a shift register.

The FEC 108 may be configured to apply a forward error correction code (FEC) to the data passed between the PMD/PMA 106 and the PCS 110. In other words, the FEC 108 may encode data passed from the PCS 110 to the PMD/PMA 106 and decode data passed from the PMD/PMA 106 to the PCS 110. The forward error correction code (FEC) may improve the reliability of data transmission at higher line speeds. The FEC 108 may apply any appropriate forward error correction code, such as a Reed-Solomon FEC described by clause 91 of the IEEE standard 802.3 (2012) or the FEC described by clause 74 of the IEEE standard 802.3 (2012). In some embodiments, the Ethernet port logic 100 may not include an FEC 108 and/or the FEC 108 may be optional. For example, for 1000BASE-KR, the Ethernet port logic 100 does not include an FEC 108. For 10GBASE-KR and 40GBASE-KR, the FEC 108 may be optional per the IEEE standard. For 100GBASE technologies, the remote link partner may be required to send RS-FEC encoded data but the local receiver may determine if the use of the FEC 108 is necessary. In embodiments that do not include the FEC 108, the PCS 110 may be coupled directly to the PMD/PMA 106.

The PCS 110 is configured to encode Ethernet frame data received from the MAC 112 into encoded data blocks that may be transmitted by the PMD/PMA 106, and to decode data received from the PMD/PMA 106 into decoded Ethernet frame data that may be processed by the MAC 112. The PCS 110 may encode and distribute the data blocks over one or more logical PCS lanes. The PCS 110 may encode data for transmission over the communication lanes 102, for example, to improve communication efficiency. Encoding the data may add timing or synchronization symbols, align the data, add state transitions to the encoded data to improve clock recovery, adjust the DC balance of the data signal, or otherwise prepare the encoded data for serial transmission. The PCS 110 may be capable of encoding or decoding the data using a 64b/66b line code in which 64-bit blocks of data are encoded into 66-bit blocks of encoded data, and vice versa. In some embodiments, the PCS 110 may be capable of encoding or decoding the data using an 8b/10b line code in which 8-bit blocks of data are encoded into 10-bit blocks of encoded data, and vice versa.

The MAC 112 is configured to transmit Ethernet frame data to the PCS 110 to be encoded and transmitted, and to receive data from the PCS 110 to produce Ethernet frame data. The MAC 112 may perform Ethernet frame detection and validation, packet reception and transmission, cyclic redundancy check (CRC) validation, CRC computation, and other media access control sublayer operations.

Figure 2:
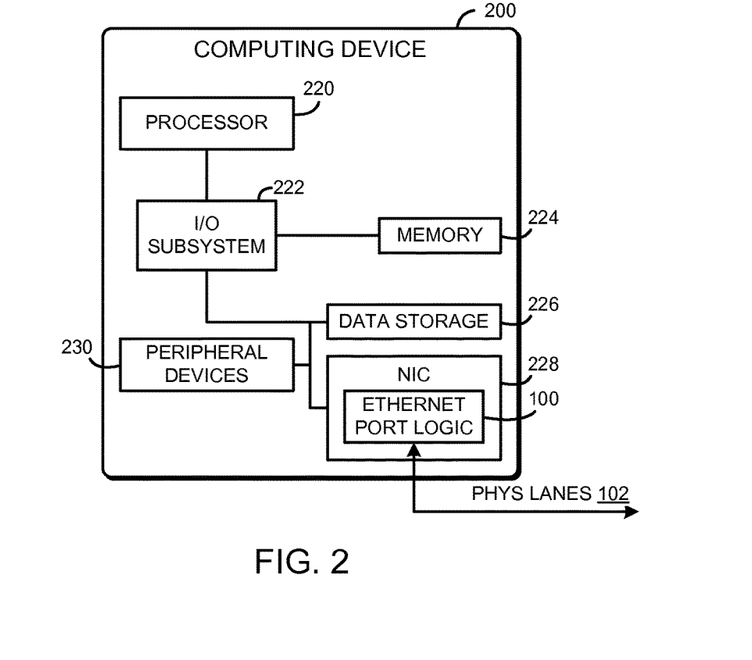
FIG. 2 is a simplified block diagram of at least one embodiment of a computing device that may include the Ethernet port logic of FIG. 1.

Referring now to FIG. 2, in an illustrative embodiment, a computing device 200 may include the Ethernet port logic 100. The computing device 200 may be embodied as any type of computation or computer device capable of performing the functions described herein, including, without limitation, a computer, a smartphone, a tablet computer, a laptop computer, a notebook computer, a mobile computing device, a wearable computing device, a multiprocessor system, a server, a rack-mounted server, a blade server, a network switch, a network appliance, a web appliance, a distributed computing system, a processor-based system, and/or a consumer electronic device. As shown in FIG. 1, the computing device 200 illustratively includes a processor 220, an input/output subsystem 222, a memory 224, a data storage device 226, and a network interface circuit or card (NIC) 228. Of course, the computing device 200 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 224, or portions thereof, may be incorporated in the processor 220 in some embodiments.

The processor 220 may be embodied as any type of processor capable of performing the functions described herein. For example, the processor 220 may be embodied as a single or multi-core processor(s), digital signal processor, microcontroller, or other processor or processing/controlling circuit. Similarly, the memory 224 may be embodied as any type of volatile or non-volatile memory or data storage capable of performing the functions described herein. In operation, the memory 224 may store various data and software used during operation of the computing device 200 such as operating systems, applications, programs, libraries, and drivers. The memory 224 is communicatively coupled to the processor 220 via the I/O subsystem 222, which may be embodied as circuitry and/or components to facilitate input/output operations with the processor 220, the memory 224, and other components of the computing device 200. For example, the I/O subsystem 222 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 222 may form a portion of a system-on-a-chip (SoC) and be incorporated, along with the processor 220, the memory 224, and other components of the computing device 200, on a single integrated circuit chip. The data storage device 226 may be embodied as any type of device or devices configured for short-term or long-term storage of data such as, for example, memory devices and circuits, memory cards, hard disk drives, solid-state drives, or other data storage devices.

The NIC 228 may connect the computing device 200 to one or more computing devices, network devices, switches, remote hosts, or other devices. The NIC 228 may be embodied as one or more add-in-boards, daughtercards, controller chips, chipsets, circuits, or other devices that may be used by the computing device 200 for network communications with remote devices. For example, the NIC 228 may be embodied as an expansion card coupled to the I/O subsystem 222 over an expansion bus such as PCI Express. In the illustrative embodiment, the NIC 228 includes a single Ethernet port logic 100 to connect to the remote devices. Of course, in other embodiments the computing device 200 may include additional or fewer Ethernet port logics 100 to support a different number of communication lanes 102.

In some embodiments, the computing device 200 may also include one or more peripheral devices 230. The peripheral devices 230 may include any number of additional input/output devices, interface devices, and/or other peripheral devices. For example, in some embodiments, the peripheral devices 230 may include a display, touch screen, graphics circuitry, keyboard, mouse, speaker system, network interface, and/or other input/output devices, interface devices, and/or peripheral devices.

Figure 3:
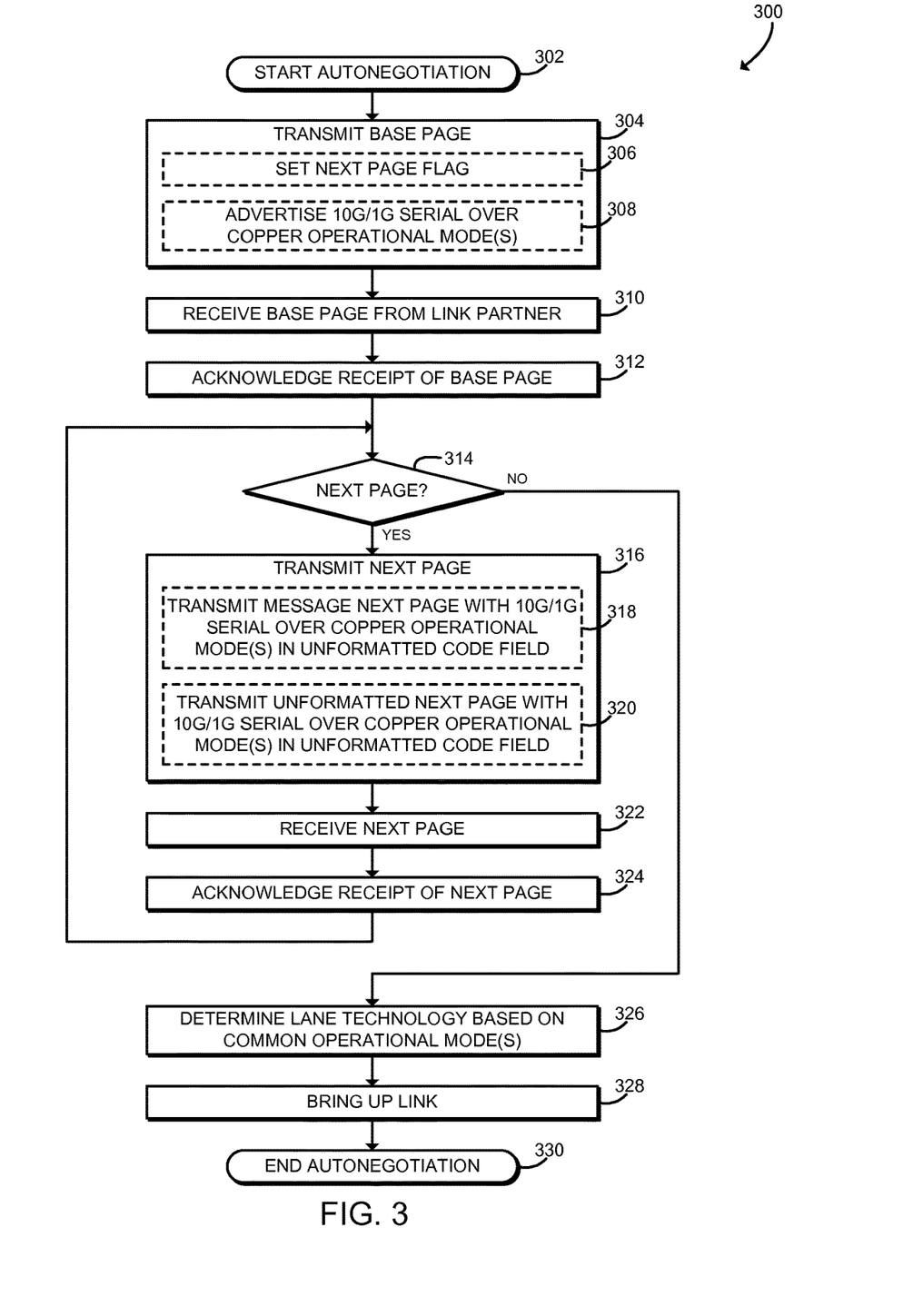
FIG. 3 is a simplified flow diagram of at least one embodiment of a method for link technology autonegotiation that may be executed by the Ethernet port logic of FIGS. 1 and 2.

Referring now to FIG. 3, in use, the Ethernet port logic 100 may execute a method 300 for link technology autonegotiation. The method 300 begins in block 302, in which the Ethernet port logic 100 starts the autonegotiation process. The autonegotiation process may be started when the Ethernet port logic 100 is powered on or when the physical communication lane 102 is connected. The autonegotiation process may also be started when the communication link is restarted or otherwise renegotiated. For example, the link may be broken and the autonegotiation process may be restarted when lower communication speeds are desired, such as when the physical medium quality is poor. The autonegotiation process may be restarted automatically or manually (e.g., in response to an administrator command).

In block 304, the Ethernet port logic 100 transmits a base page over the physical communication lane 102 to the remote link partner. The base page (also known as a base link codeword) may be embodied as any block of data initially transmitted during the autonegotiation process. For example, the base page may be embodied as a 48-bit data page encoded using a differential Manchester encoding (DME). The base page may be the same or similar to the base page described by the IEEE standard 802.3, clause 73.6 (2012). The Ethernet port logic 100 may continually transmit the base page until its receipt has been acknowledged by the remote link partner, as described below. In some embodiments, information describing single-lane communication over copper cable technology abilities may be included in the base page.

Figure 4:
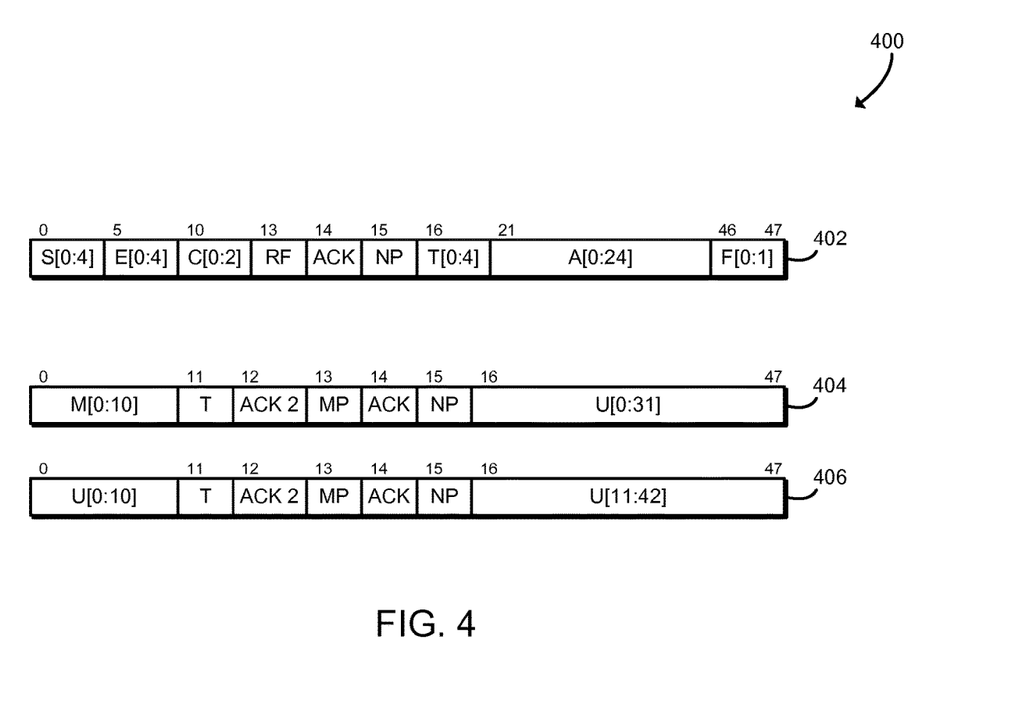
FIG. 4 is a schematic diagram of embodiments of autonegotiation pages that may be used by the Ethernet port logic of FIGS. 1 and 2.

Referring now to FIG. 4, the diagram 400 illustrates one potential embodiment of a base page 402. As shown, the base page 402 includes 48 bits organized into several bits and groups of bits called fields. In particular, the base page 402 includes a selector field S, an echoed nonce field E, a capability field C, a remote fault bit RF, an ACK bit, a next page bit NP, a transmitted nonce field T, a technology ability field A, and a forward error correction capability field F.

Referring back to FIG. 3, in some embodiments, in block 306 the Ethernet port logic 100 may set the next page flag NP of the base page. The next page flag indicates that the Ethernet port logic 100 will send more data in one or more additional data pages (called "next pages") after the base page. The Ethernet port logic 100 may set the next page flag if, for example, the information describing single-lane communication over copper cable technology abilities is not included in the base page and will be included in a next page.

In some embodiments, in block 308, the Ethernet port logic 100 may advertise one or more single-lane communication over copper cable operational modes to the remote link partner in the base page. For example, the Ethernet port logic 100 may encode that information in the ability field A of the base page, for example by enabling specific combinations of features. For example, to advertise 10-gigabit communication over copper cable, the Ethernet port logic 100 may set bits for 40-gigabit multi-lane communication over copper cable (40GBASE-CR4, bit A[4]) and 10-gigabit communication over backplane (10GBASE-KR, bit A[2]). As another example, to advertise 1-gigabit communication over copper cable, the Ethernet port logic 100 may set bits for 40-gigabit multi-lane communication over copper cable (40GBASE-CR4, bit A[4]) and 1-gigabit communication over backplane (1000BASE-KX, bit A[0]). Those combinations of bits may typically be prohibited by networking specifications or otherwise mutually exclusive because they operate on different physical media (i.e., copper cables and backplane). As another example, the Ethernet port logic 100 may advertise one or more communication over copper cable operational modes by advertising only backplane technologies over a copper cable medium. For example, to advertise 10-gigabit communication over copper cable, the Ethernet port logic 100 may set a bit for 10-gigabit communication over backplane (10GBASE-KR, bit A[2]), and to advertise 1-gigabit communication over copper cable, the Ethernet port logic 100 may set a bit for 1-gigabit communication over backplane (1000BASE-KX, bit A[0]).

In block 310, the Ethernet port logic 100 receives a base page from the remote link partner. The base page received from the remote link partner may be formatted similarly to the base page transmitted to the remote link partner. Thus, the base page received from the remote link partner may indicate that the remote link partner will transmit a next page, or may advertise one or more single-lane communication over copper cable operational modes. The Ethernet port logic 100 may ensure that it has received an identical base page several times (e.g., at least three times) prior to proceeding. Additionally, although illustrated as occurring sequentially after transmitting the base page, it should be understood that the Ethernet port logic 100 may transmit and receive autonegotiation pages simultaneously.

In block 312, the Ethernet port logic 100 acknowledges receipt of the base page to the remote link partner. The Ethernet port logic 100 may, for example, continue transmitting the base page with the ACK bit set, with the echoed nonce field E set to a nonce received from the link partner, or with any other indication of acknowledgement. The Ethernet port logic 100 may also verify that the remote link partner has similarly acknowledged receipt of the base page.

In block 314, the Ethernet port logic 100 determines whether to transmit a next page to the remote link partner. The Ethernet port logic 100 may transmit a next page, for example, to transmit information on single-lane communication over copper cable technology abilities to the remote link partner. The Ethernet port logic 100 may also transmit a null, zeroed, or otherwise empty next page if the remote link partner has indicated that it will transmit a next page (for example by setting the NP bit of the base page), even if the Ethernet port logic 100 has no next page information of its own. If the Ethernet port logic 100 determines not to transmit a next page, for example if all pages have been transmitted, the method 300 branches ahead to block 326. If the Ethernet port logic 100 determines to transmit a next page, the method 300 advances to block 316.

In block 316, the Ethernet port logic 100 transmits a next page to the remote link partner. The next page may be embodied as a block of data transmitted during the autonegotiation process similar to a base page. For example, the next page may be embodied as a 48-bit data page encoded using a differential Manchester encoding (DME). The next page may be the same or similar to the next page described by the IEEE standard 802.3, clause 73.7.7 (2012). The Ethernet port logic 100 may continually transmit the next page until its receipt has been acknowledged by the remote link partner, as described below. In some embodiments, information describing communication over copper cable technology abilities may be included in the next page.

Referring now to FIG. 4, the diagram 400 illustrates two potential embodiments of next pages 404, 406. As shown, each of the next pages 404, 406 includes 48 bits organized into several bits and groups of bits called fields (not to scale). The next page 404 is a message next page, and includes both a message code field M and an unformatted code field U. In particular, the message next page includes the message code field M, a toggle bit T, an acknowledge 2 bit ACK 2, a message page bit MP (always set for message next pages 404), an acknowledge bit ACK, a next page bit NP, and the unformatted code field U. The next page 406 is an unformatted next page, and includes the unformatted code field U, the toggle bit T, the acknowledge 2 bit ACK 2, the message page bit MP (always unset for unformatted next pages 406), the acknowledge bit ACK, and the next page bit NP, but does not include the message code field M.

Referring back to FIG. 3, in some embodiments in block 318 the Ethernet port logic 100 may transmit a message next page. In those embodiments, the message code field M may be set to a unique identifier, for example to a binary representation of the value 32, or other identifier. The unique identifier may be reserved or otherwise not specified by IEEE standard 802.3 (2012). In those embodiments, one or more bits of the unformatted code field U may be set to indicate single-lane communication over copper cable technology abilities. For example, bit U[0] may be set to indicate 1-gigabit communication over copper cable technology ability, and bit U[1] may be set to indicate 10-gigabit communication over copper cable technology ability.

In some embodiments, in block 320, the Ethernet port logic 100 may transmit an unformatted next page. For example, in some embodiments the Ethernet port logic 100 may first transmit a message next page that includes the organizationally unique identifier (OUI) tagged message code and an organizationally unique identifier (OUI) associated with a vendor or other organization related to the Ethernet port logic 100. In those embodiments, after transmitting the OUI tagged message code page, the Ethernet port logic 100 may next transmit an unformatted next page including a user-defined code in the unformatted code field U. In those embodiments, similar to a message next page described in connection with block 318, one or more bits of the unformatted code field U may be set to indicate single-lane communication over copper cable technology abilities. For example, bit U[0] may be set to indicate 1-gigabit communication over copper cable technology ability, and bit U[1] may be set to indicate 10-gigabit communication over copper cable technology ability.

In block 322, the Ethernet port logic 100 receives a next page from the remote link partner. The next page received from the remote link partner may be formatted similarly to the next page transmitted to the remote link partner. Thus, the next page received from the remote link partner may indicate one or more single-lane communication over copper cable technology abilities. The next page received from the remote link partner may also indicate whether additional next pages remain to be transmitted. The Ethernet port logic 100 may ensure that it has received an identical next page several times (e.g., at least three times) prior to proceeding. Additionally, although illustrated as occurring sequentially after transmitting the next page, it should be understood that the Ethernet port logic 100 may transmit and receive autonegotiation next pages simultaneously.

In block 324, the Ethernet port logic 100 acknowledges receipt of the next page to the remote link partner. The Ethernet port logic 100 may, for example, continue transmitting the next page with the ACK bit set, with the echoed nonce field E set to a nonce received from the link partner, or with any other indication of acknowledgement. The Ethernet port logic 100 may set the ACK 2 bit if the Ethernet port logic 100 is able to act on the information or perform the task described in the next page. The Ethernet port logic 100 may also verify that the remote link partner has similarly acknowledged receipt of the next page. After acknowledging receipt of the next page, the method 300 loops back to block 314 to determine whether additional next pages should be exchanged.

Referring back to block 314, if no additional next pages remain, the method 300 branches to block 326. In block 326, the Ethernet port logic 100 determines the operational mode to use for the physical communication lane 102 based on common technological abilities exchanged with the remote link partner. The Ethernet port logic 100 may use any rules, policies, or conflict resolution algorithm to determine the lane technology. For example, the Ethernet port logic 100 may select the "highest common denominator" technology shared by the Ethernet port logic 100 and the remote link partner. In other words, the Ethernet port logic 100 may find all common technologies with the remote link partner and select the technology with the highest predefined priority. In that example, the Ethernet port logic 100 may select a communication over copper cable technology at 1 Gb/s or 10 Gb/s only if faster communication over copper cable technologies (e.g., 100GBASE-CR10 or 40GBASE-CR4) are not available. As another example, the Ethernet port logic 100 may always select a shared communication over copper cable technology at 1 Gb/s or 10 Gb/s. In that example, the Ethernet port logic 100 may select 1 Gb/s or 10 Gb/s single-lane communication over copper cable even if the Ethernet port logic 100 and the remote link partner are both capable of faster multi-lane communication over copper cable (e.g., 100GBASE-CR10 or 40GBASE-CR4). In particular, the Ethernet port logic 100 and the remote link partner may both be configured to select communication over copper cable technologies advertised in a next page instead of multi-lane communication technologies advertised in the base page, overriding the autonegotiation behavior specified by clause 73 of the IEEE standard 802.3 (2012).

In block 328, the Ethernet port logic 100 brings up the communication link with the remote link partner using the operational mode determined above in connection with block 326. If bringing up 1-gigabit communication over copper cable, the Ethernet port logic 100 may operate as described for 1-gigabit communication over backplane (1000BASE-KX) in the IEEE standard 802.3, at clause 70 (2012). If bringing up 10-gigabit communication over copper cable, the Ethernet port logic 100 may operate as described for 10-gigabit communication over backplane (10GBASE-KR) in the IEEE standard 802.3, at clause 72 (2012). The Ethernet port logic 100 may apply data encoding as appropriate for the selected operational mode. For example, an 8b/10b encoding (described by clause 36 of the IEEE standard 802.3) may be used for 1 Gb/s communications and a 64b/66b encoding (described by clause 49 of the IEEE standard 802.3) may be used for 10 Gb/s communications. The Ethernet port logic 100 may also apply a link training procedure if supported by the selected operational mode. For example, the PMD control function (described by clause 72.6.10 of the IEEE standard 802.3) may be applied for 10 Gb/s communications, but not for 1 Gb/s communications. If the Ethernet port logic 100 fails to bring up the communication link, the Ethernet port logic 100 may restart the autonegotiation process of the method 300, and the Ethernet port logic 100 may attempt to use a slower operational mode when renegotiating the communication link. For example, if bringing up the communication link fails for 40-gigabit multi-lane communications over copper cable (40GBASE-CR4), the Ethernet port logic 100 may attempt to renegotiate the communication link using 10-gigabit or 1-gigabit communications over copper cable.

In block 330, the Ethernet port logic 100 ends the autonegotiation process. After completing the autonegotiation process, the Ethernet port logic 100 transmits and receives data as normal, using the autonegotiated operational mode. The Ethernet port logic 100 may not perform any autonegotiation or transmit autonegotiation pages while the communication link is active with the remote link partner. As described above, the Ethernet port logic 100 may restart the autonegotiation method 300 if the communication link is broken or disconnected, if the Ethernet port logic 100 is power-cycled, or if a manual renegotiation has been triggered.

EXAMPLES

Illustrative examples of the technologies disclosed herein are provided below. An embodiment of the technologies may include any one or more, and any combination of, the examples described below.

Example 1 includes a network interface circuit for link technology autonegotiation, the network interface circuit comprising a network port logic comprising an autonegotiation logic, wherein the autonegotiation logic is to transmit a first autonegotiation page to a remote link partner, wherein the first autonegotiation page is indicative of a first operational mode, wherein the first operational mode includes single-lane communication over copper cable; receive a second autonegotiation page from the remote link partner, wherein the second autonegotiation page is indicative of the first operational mode; and activate a communication link with the remote link partner using the first operational mode in response to transmission of the first autonegotiation page and reception of the second autonegotiation page.

Example 2 includes the subject matter of Example 1, and wherein the autonegotiation logic is further to determine whether the second autonegotiation page is indicative of the first operational mode; and to activate the communication link comprises to activate the communication link in response to a determination that the second autonegotiation page is indicative of the first operational mode.

Example 3 includes the subject matter of any of Examples 1 and 2, and wherein to transmit the first autonegotiation page comprises to transmit a 48-bit data page using a differential Manchester encoding via the communication link with the remote link partner; and to receive the second autonegotiation page comprises to receive a 48-bit data page using the differential Manchester encoding via the communication link with the remote link partner.

Example 4 includes the subject matter of any of Examples 1-3, and wherein the first operational mode comprises a 10-gigabit communication over backplane technology ability using a copper cable medium.

Example 5 includes the subject matter of any of Examples 1-4, and wherein the first operational mode comprises a 1-gigabit communication over backplane technology ability using a copper cable medium.

Example 6 includes the subject matter of any of Examples 1-5, and wherein to transmit the first autonegotiation page comprises to transmit a first next page that includes a technology ability bit, wherein the technology ability bit is indicative of the first operational mode; and to receive the second autonegotiation page comprises to receive a second next page including a technology ability bit, wherein the technology ability bit is indicative of the first operational mode.

Example 7 includes the subject matter of any of Examples 1-6, and wherein the first next page further comprises a message code field indicative of a first unique identifier; and the second next page further comprises a message code field indicative of the first unique identifier.

Example 8 includes the subject matter of any of Examples 1-7, and wherein the autonegotiation logic is further to transmit a third autonegotiation page to the remote link partner, wherein the third autonegotiation page comprises a message code field indicative of an organizationally unique identifier tagged message code and an unformatted code indicative of an organizationally unique identifier; and receive a fourth autonegotiation page from the remote link partner, wherein the fourth autonegotiation page comprises a message code field indicative of the organizationally unique identifier tagged message code and an unformatted code indicative of the organizationally unique identifier.

Example 9 includes the subject matter of any of Examples 1-8, and wherein the autonegotiation logic is further to transmit a first base page to the remote link partner, wherein the first base page is indicative of a second operational mode, wherein the second operational mode includes multi-lane communication over copper cable; and receive a second base page from the remote link partner, wherein the second base page is indicative of the second operational mode.

Example 10 includes the subject matter of any of Examples 1-9, and wherein to transmit the first autonegotiation page comprises to transmit a first base page that includes a technology ability field, wherein the technology ability field is indicative of the first operational mode; and to receive the second autonegotiation page comprises to receive a second base page that includes a technology ability field, wherein the technology ability field is indicative of the first operational mode.

Example 11 includes the subject matter of any of Examples 1-10, and wherein the technology ability field of the first base page is indicative of a communication over backplane technology ability; and the technology ability field of the second base page is indicative of the communication over backplane technology ability.

Example 12 includes the subject matter of any of Examples 1-11, and wherein the technology ability field of the first base page is indicative of a 10-gigabit communication over backplane technology ability; and the technology ability field of the second base page is indicative of the 10-gigabit communication over backplane technology ability.

Example 13 includes the subject matter of any of Examples 1-12, and wherein the technology ability field of the first base page is further indicative of a 40-gigabit multi-lane communication over copper cable technology ability; and the technology ability field of the second base page is further indicative of the 40-gigabit multi-lane communication over copper cable technology ability.

Example 14 includes the subject matter of any of Examples 1-13, and wherein the technology ability field of the first base page is indicative of a 1-gigabit communication over backplane technology ability; and the technology ability field of the second base page is indicative of the 1-gigabit communication over backplane technology ability.

Example 15 includes the subject matter of any of Examples 1-14, and wherein the technology ability field of the first base page is further indicative of a 40-gigabit multi-lane communication over copper cable technology ability; and the technology ability field of the second base page is further indicative of the 40-gigabit multi-lane communication over copper cable technology ability.

Example 16 includes a method for link technology autonegotiation, the method comprising transmitting, by a network port logic, a first autonegotiation page to a remote link partner, wherein the first autonegotiation page is indicative of a first operational mode, wherein the first operational mode includes single-lane communication over copper cable; receiving, by the network port logic, a second autonegotiation page from the remote link partner, wherein the second autonegotiation page is indicative of the first operational mode; and activating, by the network port logic, a communication link with the remote link partner using the first operational mode in response to transmitting the first autonegotiation page and receiving the second autonegotiation page.

Example 17 includes the subject matter of Example 16, and further including determining, by the network port logic, whether the second autonegotiation page is indicative of the first operational mode; wherein activating the communication link comprises activating the communication link in response to determining the second autonegotiation page is indicative of the first operational mode.

Example 18 includes the subject matter of any of Examples 16 and 17, and wherein transmitting the first autonegotiation page comprises transmitting a 48-bit data page using a differential Manchester encoding via the communication link with the remote link partner; and receiving the second autonegotiation page comprises receiving a 48-bit data page using the differential Manchester encoding via the communication link with the remote link partner.

Example 19 includes the subject matter of any of Examples 16-18, and wherein the first operational mode comprises a 10-gigabit communication over backplane technology ability using a copper cable medium.

Example 20 includes the subject matter of any of Examples 16-19, and wherein the first operational mode comprises a 1-gigabit communication over backplane technology ability using a copper cable medium.

Example 21 includes the subject matter of any of Examples 16-20, and wherein transmitting the first autonegotiation page comprises transmitting a first next page including a technology ability bit, wherein the technology ability bit is indicative of the first operational mode; and receiving the second autonegotiation page comprises receiving a second next page including a technology ability bit, wherein the technology ability bit is indicative of the first operational mode.

Example 22 includes the subject matter of any of Examples 16-21, and wherein the first next page further comprises a message code field indicative of a first unique identifier; and the second next page further comprises a message code field indicative of the first unique identifier.

Example 23 includes the subject matter of any of Examples 16-22, and further including transmitting, by the network port logic, a third autonegotiation page to the remote link partner, wherein the third autonegotiation page comprises a message code field indicative of an organizationally unique identifier tagged message code and an unformatted code indicative of an organizationally unique identifier; and receiving, by the network port logic, a fourth autonegotiation page from the remote link partner, wherein the fourth autonegotiation page comprises a message code field indicative of the organizationally unique identifier tagged message code and an unformatted code indicative of the organizationally unique identifier.

Example 24 includes the subject matter of any of Examples 16-23, and further including transmitting, by the network port logic, a first base page to the remote link partner, wherein the first base page is indicative of a second operational mode, wherein the second operational mode includes multi-lane communication over copper cable; and receiving, by the network port logic, a second base page from the remote link partner, wherein the second base page is indicative of the second operational mode.

Example 25 includes the subject matter of any of Examples 16-24, and wherein transmitting the first autonegotiation page comprises transmitting a first base page including a technology ability field, wherein the technology ability field is indicative of the first operational mode; and receiving the second autonegotiation page comprises receiving a second base page including a technology ability field, wherein the technology ability field is indicative of the first operational mode.

Example 26 includes the subject matter of any of Examples 16-25, and wherein the technology ability field of the first base page is indicative of a communication over backplane technology ability; and the technology ability field of the second base page is indicative of the communication over backplane technology ability.

Example 27 includes the subject matter of any of Examples 16-26, and wherein the technology ability field of the first base page is indicative of a 10-gigabit communication over backplane technology ability; and the technology ability field of the second base page is indicative of the 10-gigabit communication over backplane technology ability.

Example 28 includes the subject matter of any of Examples 16-27, and wherein the technology ability field of the first base page is further indicative of a 40-gigabit multi-lane communication over copper cable technology ability; and the technology ability field of the second base page is further indicative of the 40-gigabit multi-lane communication over copper cable technology ability.

Example 29 includes the subject matter of any of Examples 16-28, and wherein the technology ability field of the first base page is indicative of a 1-gigabit communication over backplane technology ability; and the technology ability field of the second base page is indicative of the 1-gigabit communication over backplane technology ability.

Example 30 includes the subject matter of any of Examples 16-29, and wherein the technology ability field of the first base page is further indicative of a 40-gigabit multi-lane communication over copper cable technology ability; and the technology ability field of the second base page is further indicative of the 40-gigabit multi-lane communication over copper cable technology ability.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for link technology autonegotiation, the computing device comprising means for transmitting a first autonegotiation page to a remote link partner, wherein the first autonegotiation page is indicative of a first operational mode, wherein the first operational mode includes single-lane communication over copper cable; means for receiving a second autonegotiation page from the remote link partner, wherein the second autonegotiation page is indicative of the first operational mode; and means for activating a communication link with the remote link partner using the first operational mode in response to transmitting the first autonegotiation page and receiving the second autonegotiation page.

Example 35 includes the subject matter of Example 34, and further including means for determining whether the second autonegotiation page is indicative of the first operational mode; wherein the means for activating the communication link comprises means for activating the communication link in response to determining the second autonegotiation page is indicative of the first operational mode.

Example 36 includes the subject matter of any of Examples 34 and 35, and wherein the means for transmitting the first autonegotiation page comprises means for transmitting a 48-bit data page using a differential Manchester encoding via the communication link with the remote link partner; and the means for receiving the second autonegotiation page comprises means for receiving a 48-bit data page using the differential Manchester encoding via the communication link with the remote link partner.

Example 37 includes the subject matter of any of Examples 34-36, and wherein the first operational mode comprises a 10-gigabit communication over backplane technology ability using a copper cable medium.

Example 38 includes the subject matter of any of Examples 34-37, and wherein the first operational mode comprises a 1-gigabit communication over backplane technology ability using a copper cable medium.

Example 39 includes the subject matter of any of Examples 34-38, and wherein the means for transmitting the first autonegotiation page comprises means for transmitting a first next page including a technology ability bit, wherein the technology ability bit is indicative of the first operational mode; and the means for receiving the second autonegotiation page comprises means for receiving a second next page including a technology ability bit, wherein the technology ability bit is indicative of the first operational mode.

Example 40 includes the subject matter of any of Examples 34-39, and wherein the first next page further comprises a message code field indicative of a first unique identifier; and the second next page further comprises a message code field indicative of the first unique identifier.

Example 41 includes the subject matter of any of Examples 34-40, and further including means for transmitting a third autonegotiation page to the remote link partner, wherein the third autonegotiation page comprises a message code field indicative of an organizationally unique identifier tagged message code and an unformatted code indicative of an organizationally unique identifier; and means for receiving a fourth autonegotiation page from the remote link partner, wherein the fourth autonegotiation page comprises a message code field indicative of the organizationally unique identifier tagged message code and an unformatted code indicative of the organizationally unique identifier.

Example 42 includes the subject matter of any of Examples 34-41, and further including means for transmitting a first base page to the remote link partner, wherein the first base page is indicative of a second operational mode, wherein the second operational mode includes multi-lane communication over copper cable; and means for receiving a second base page from the remote link partner, wherein the second base page is indicative of the second operational mode.

Example 43 includes the subject matter of any of Examples 34-42, and wherein the means for transmitting the first autonegotiation page comprises means for transmitting a first base page including a technology ability field, wherein the technology ability field is indicative of the first operational mode; and the means for receiving the second autonegotiation page comprises means for receiving a second base page including a technology ability field, wherein the technology ability field is indicative of the first operational mode.

Example 44 includes the subject matter of any of Examples 34-43, and wherein the technology ability field of the first base page is indicative of a communication over backplane technology ability; and the technology ability field of the second base page is indicative of the communication over backplane technology ability.

Example 45 includes the subject matter of any of Examples 34-44, and wherein the technology ability field of the first base page is indicative of a 10-gigabit communication over backplane technology ability; and the technology ability field of the second base page is indicative of the 10-gigabit communication over backplane technology ability.

Example 46 includes the subject matter of any of Examples 34-45, and wherein the technology ability field of the first base page is further indicative of a 40-gigabit multi-lane communication over copper cable technology ability; and the technology ability field of the second base page is further indicative of the 40-gigabit multi-lane communication over copper cable technology ability.

Example 47 includes the subject matter of any of Examples 34-46, and wherein the technology ability field of the first base page is indicative of a 1-gigabit communication over backplane technology ability; and the technology ability field of the second base page is indicative of the 1-gigabit communication over backplane technology ability.

Example 48 includes the subject matter of any of Examples 34-47, and wherein the technology ability field of the first base page is further indicative of a 40-gigabit multi-lane communication over copper cable technology ability; and the technology ability field of the second base page is further indicative of the 40-gigabit multi-lane communication over copper cable technology ability.

The invention claimed is:

1. A network interface circuit for link technology autonegotiation, the network interface circuit comprising:
   a network port logic comprising an autonegotiation logic, wherein the autonegotiation logic is to:
      transmit a first autonegotiation page to a remote link partner, wherein the first autonegotiation page is indicative of a first operational mode, wherein the first operational mode includes single-lane communication over copper cable, and wherein the first autonegotiation page comprises a next page that includes a technology bit that is indicative of the first operational mode;
      receive a second autonegotiation page from the remote link partner, wherein the second autonegotiation page is indicative of the first operational mode, and wherein the second autonegotiation page comprises a next page that includes a technology bit that is indicative of the first operational mode; and
      activate a communication link with the remote link partner using the first operational mode over a copper cable medium in response to receipt of the second autonegotiation page.

2. The network interface circuit of claim 1, wherein the first operational mode comprises a 10-gigabit single-lane communication using the copper cable medium.

3. The network interface circuit of claim 1, wherein the first operational mode comprises a 1-gigabit single-lane communication using the copper cable medium.

4. The network interface circuit of claim 1, wherein:
   the first autonegotiation page further comprises a message code field indicative of a first unique identifier; and
   the second autonegotiation page further comprises a message code field indicative of the first unique identifier.

5. The network interface circuit of claim 1, wherein the autonegotiation logic is further to:
   transmit a third autonegotiation page to the remote link partner, wherein the third autonegotiation page comprises a message code field indicative of an organizationally unique identifier tagged message code and an unformatted code indicative of an organizationally unique identifier; and
   receive a fourth autonegotiation page from the remote link partner, wherein the fourth autonegotiation page comprises a message code field indicative of the organizationally unique identifier tagged message code and an unformatted code indicative of the organizationally unique identifier.

6. The network interface circuit of claim 1, wherein the autonegotiation logic is further to:
   transmit a first base page to the remote link partner, wherein the first base page is indicative of a second operational mode, wherein the second operational mode includes multi-lane communication over copper cable; and
   receive a second base page from the remote link partner, wherein the second base page is indicative of the second operational mode.

7. The network interface circuit of claim 6, wherein the second operational mode comprises 40-gigabit multi-lane communication using the copper cable medium.

8. The network interface circuit of claim 6, wherein the second operational mode comprises 100-gigabit multi-lane communication using the copper cable medium.

9. The network interface circuit of claim 6, wherein the autonegotiation logic is further to:
   select the first operational mode in response to receipt of the second autonegotiation page and in response to receipt of the second base page;
   wherein to activate the communication link comprises to activate the communication link in response to selection of the first operational mode.

10. A method for link technology autonegotiation, the method comprising:
   transmitting, by a network port logic, a first autonegotiation page to a remote link partner, wherein the first autonegotiation page is indicative of a first operational mode, wherein the first operational mode includes single-lane communication over copper cable, and wherein the first autonegotiation page comprises a next page that includes a technology bit that is indicative of the first operational mode;
   receiving, by the network port logic, a second autonegotiation page from the remote link partner, wherein the second autonegotiation page is indicative of the first operational mode, and wherein the second autonegotiation page comprises a next page that includes a technology bit that is indicative of the first operational mode; and
   activating, by the network port logic, a communication link with the remote link partner using the first operational mode over a copper cable medium in response to receiving the second autonegotiation page.

11. The method of claim 10, wherein the first operational mode comprises a 10-gigabit single-lane communication using the copper cable medium.

12. The method of claim 10, wherein the first operational mode comprises a 1-gigabit single-lane communication using the copper cable medium.

13. The method of claim 10, further comprising:
transmitting, by the network port logic, a first base page to the remote link partner, wherein the first base page is indicative of a second operational mode, wherein the second operational mode includes multi-lane communication over copper cable; and
receiving, by the network port logic, a second base page from the remote link partner, wherein the second base page is indicative of the second operational mode.

14. The method of claim 13, further comprising:
selecting, by the network port logic, the first operational mode in response to receiving the second autonegotiation page and in response to receiving the second base page;
wherein activating the communication link comprises activating the communication link in response to selecting the first operational mode.

15. One or more non-transitory, computer-readable storage media comprising a plurality of instructions that in response to being executed cause a computing device to:
transmit a first autonegotiation page to a remote link partner, wherein the first autonegotiation page is indicative of a first operational mode, wherein the first operational mode includes single-lane communication over copper cable, and wherein the first autonegotiation page comprises a next page that includes a technology bit that is indicative of the first operational mode;
receive a second autonegotiation page from the remote link partner, wherein the second autonegotiation page is indicative of the first operational mode, and wherein the second autonegotiation page comprises a next page that includes a technology bit that is indicative of the first operational mode; and
activate a communication link with the remote link partner using the first operational mode over a copper cable medium in response to transmitting the first autonegotiation page and receiving the second autonegotiation page.

16. The one or more non-transitory, computer-readable storage media of claim 15, wherein the first operational mode comprises a 10-gigabit single-lane communication using the copper cable medium.

17. The one or more non-transitory, computer-readable storage media of claim 15, wherein the first operational mode comprises a 1-gigabit single-lane communication using the copper cable medium.

18. The one or more non-transitory, computer-readable storage media of claim 15, wherein:
the first autonegotiation page further comprises a message code field indicative of a first unique identifier; and
the second autonegotiation page further comprises a message code field indicative of the first unique identifier.

19. The one or more non-transitory, computer-readable storage media of claim 15, further comprising a plurality of instructions that in response to being executed cause the computing device to:
transmit a first base page to the remote link partner, wherein the first base page is indicative of a second operational mode, wherein the second operational mode includes multi-lane communication over copper cable; and
receive a second base page from the remote link partner, wherein the second base page is indicative of the second operational mode.

20. The one or more non-transitory, computer-readable storage media of claim 19, further comprising a plurality of instructions that in response to being executed cause the computing device to:
select the first operational mode in response to receiving the second autonegotiation page and in response to receiving the second base page;
wherein to activate the communication link comprises to activate the communication link in response to selecting the first operational mode.

* * * * *